(12) United States Patent
Yasuda et al.

(10) Patent No.: US 9,926,860 B2
(45) Date of Patent: Mar. 27, 2018

(54) CONTROL DEVICE FOR SPARK-IGNITION ENGINE

(71) Applicant: MAZDA MOTOR CORPORATION, Hiroshima (JP)

(72) Inventors: Kyohei Yasuda, Hiroshima (JP); Tomomi Watanabe, Hiroshima (JP); Takafumi Nishio, Otake (JP)

(73) Assignee: MAZDA MOTOR CORPORATION, Hirsoshima (JP)

( * ) Notice: Subject to any disclaimer, the term of this patent is extended or adjusted under 35 U.S.C. 154(b) by 0 days.

(21) Appl. No.: 14/783,358

(22) PCT Filed: Apr. 3, 2014

(86) PCT No.: PCT/JP2014/001942
§ 371 (c)(1),
(2) Date: Oct. 8, 2015

(87) PCT Pub. No.: WO2014/171092
PCT Pub. Date: Dec. 23, 2014

(65) Prior Publication Data
US 2016/0069280 A1   Mar. 10, 2016

(30) Foreign Application Priority Data

Apr. 15, 2013   (JP) .................................. 2013-084713

(51) Int. Cl.
*F02D 19/08* (2006.01)
*F02D 13/02* (2006.01)
(Continued)

(52) U.S. Cl.
CPC .......... *F02D 19/084* (2013.01); *F02D 11/105* (2013.01); *F02D 13/0215* (2013.01);
(Continued)

(58) Field of Classification Search
CPC .. F02D 19/084; F02D 41/0002; F02D 11/105; F02D 41/068; F02D 41/402;
(Continued)

(56) References Cited

U.S. PATENT DOCUMENTS

| 5,178,121 A * | 1/1993 | Kitajima | F02D 19/0631 123/689 |
| 5,197,450 A * | 3/1993 | Kitajima | F02D 41/0025 123/1 A |

(Continued)

FOREIGN PATENT DOCUMENTS

| JP | H03-121227 A | 5/1991 |
| JP | 2008-069700 A | 3/2008 |

(Continued)

OTHER PUBLICATIONS

International Search Report issued in Application No. PCT/JP2014/001942, dated May 13, 2014.

(Continued)

*Primary Examiner* — Joseph Dallo
(74) *Attorney, Agent, or Firm* — Studebaker & Brackett PC

(57) ABSTRACT

A controller (an engine controller 100) feeds a fuel into a cylinder 11 through a fuel feeder (including a fuel injection valve 53 and a fuel feeding system 54) when the cylinder 11 is in an intake stroke and a compression stroke and if an engine body (an engine 1) is both in a cold running phase and under a heavy load. The engine body at or below a predetermined temperature is in the cold running phase. The load applied to the engine body is heavy when the engine body is under at least a predetermined load. The controller also lowers the upper limit of the charging efficiency of the engine body as the vaporization rate of the fuel fed into the cylinder decreases.

8 Claims, 5 Drawing Sheets

(51) Int. Cl.
*F02D 19/06* (2006.01)
*F02D 41/02* (2006.01)
*F02D 41/06* (2006.01)
*F02D 41/00* (2006.01)
*F02D 41/40* (2006.01)
*F02D 11/10* (2006.01)
*F02B 23/10* (2006.01)
*F02D 15/04* (2006.01)

(52) U.S. Cl.
CPC ......... *F02D 19/061* (2013.01); *F02D 19/088* (2013.01); *F02D 41/0002* (2013.01); *F02D 41/0025* (2013.01); *F02D 41/028* (2013.01); *F02D 41/064* (2013.01); *F02D 41/068* (2013.01); *F02D 41/402* (2013.01); *F02B 23/104* (2013.01); *F02D 15/04* (2013.01); *F02D 2200/021* (2013.01); *F02D 2200/0411* (2013.01); *F02D 2200/602* (2013.01); *Y02T 10/18* (2013.01); *Y02T 10/36* (2013.01); *Y02T 10/42* (2013.01); *Y02T 10/44* (2013.01)

(58) Field of Classification Search
CPC .. F02D 41/0025; F02D 41/028; F02D 41/064; F02D 19/088; F02D 19/061; F02D 13/0215; F02D 2200/021; F02D 2200/0411; Y02T 10/42
See application file for complete search history.

(56) References Cited

U.S. PATENT DOCUMENTS

| | | | | |
|---|---|---|---|---|
| 6,347,612 B1* | 2/2002 | Nishimura | .......... | F02D 41/0002 123/295 |
| 6,408,806 B2* | 6/2002 | Sugiyama | ................. | F01L 1/34 123/90.12 |
| 6,478,007 B2* | 11/2002 | Miyashita | ............. | F02B 23/104 123/179.16 |
| 6,637,386 B2* | 10/2003 | Murata | ..................... | F01L 1/34 123/90.15 |
| 6,691,655 B2* | 2/2004 | Aoyama | ................. | F01L 1/022 123/406.45 |
| 8,511,279 B2* | 8/2013 | Akihisa | ............... | F02D 13/0226 123/179.18 |
| 2003/0116131 A1* | 6/2003 | Majima | ................... | F02D 13/04 123/406.53 |
| 2003/0213451 A1* | 11/2003 | Aoyama | ................. | F01L 1/022 123/90.16 |
| 2009/0093950 A1* | 4/2009 | Yi | ........................ | F02D 13/0265 701/105 |
| 2009/0276142 A1* | 11/2009 | Leone | ................. | F02D 13/0215 701/103 |
| 2011/0271920 A1 | 11/2011 | Akihisa et al. | | |

FOREIGN PATENT DOCUMENTS

| | | |
|---|---|---|
| JP | 2008-223676 A | 9/2008 |
| JP | 2009-191650 A | 8/2009 |
| JP | 2010-037968 A | 2/2010 |
| JP | 2010-133288 A | 6/2010 |
| WO | 2010/079623 A1 | 7/2010 |

OTHER PUBLICATIONS

Written Opinion issued in Application No. PCT/JP2014/001942 dated May 13, 2014; with English language partial translation.

\* cited by examiner

CONTROL DEVICE FOR SPARK-IGNITION ENGINE

TECHNICAL FIELD

The present disclosure relates to a control device for a spark-ignition engine, and more particularly relates to a control device for a spark-ignition engine configured to be fed with a fuel including an unconventional fuel having, at or below a specific temperature, a lower vaporization rate than gasoline.

BACKGROUND ART

In recent years, biofuels have caught some attention from the viewpoint of environmental issues such as global warming. As a result, flexible fuel vehicles (FFVs) that can run with a fuel including gasoline and bioethanol, for example, at any arbitrary blend ratio have already been put on the market. Ethanol contents of fuels for FFVs vary depending on the blend ratio of gasoline and ethanol for the fuels available on the market. Examples of such variations range from E25 (i.e., a blend of 25% ethanol and 75% gasoline) to E100 (i.e., 100% ethanol), or from E0 (i.e., 100% gasoline) to E85 (i.e., a blend of 85% ethanol and 15% gasoline). Note that E100 here includes E100 containing approximately 5% of water (i.e., 5% water and 95% ethanol) that has not been sufficiently removed through the distillation processes of ethanol which is still left there.

In such FFVs, the properties of their fuels vary depending on the ethanol content of the fuels. In other words, gasoline, which is a multicomponent fuel, has a boiling point falling within the range of 27° C. to 225° C. FIG. 2 shows a change in the distillation ratio of gasoline with temperature. As can be seen from FIG. 2, the vaporization ratio of gasoline is relatively high even if its temperature is relatively low. In contrast, ethanol, which is a single component fuel, has a standard boiling point of 78° C. Thus, ethanol at a relatively low temperature has a vaporization rate of 0%, which is lower than that of gasoline. On the other hand, ethanol at a relatively high temperature has a vaporization rate of 100%, which is higher than that of gasoline. Hence, when the engine temperature of an FFV is low, i.e., equal to or lower than a predetermined temperature, the fuel vaporizability in a cylinder decreases as the ethanol content of the fuel rises or the engine temperature falls. Specifically, if the vaporization rate is defined as the ratio by weight of the fuel contributing to combustion to the fuel fed into the cylinder, the vaporization rate decreases as the ethanol content rises or as the engine temperature falls. When the engine is run cold with E100, for example, there arises a problem that the low vaporization rate causes deterioration in ignitability and/or combustion stability of an air-fuel mixture. In particular, this problem is serious with the water-containing E100.

For example, PATENT DOCUMENT 1 discloses an FFV engine system which extracts a fuel having a high gasoline content from a main tank storing a fuel that contains gasoline and ethanol at any given blend ratio; transfers the extracted fuel to a sub-tank which provided separately from the main tank; and stores the fuel in the sub tank. The engine system disclosed in PATENT DOCUMENT 1 allows the sub-tank to store constantly a fuel with stabilized vaporizability. Hence, when the engine system disclosed in PATENT DOCUMENT 1 uses a fuel having a high ethanol content, the system blends, at an appropriate ratio, the fuel stored in the main tank with the fuel stored in the sub-tank and having a high gasoline content, under a running condition (e.g., when the engine system is run cold) causing a decrease in the ignitability and/or combustion stability of the air-fuel mixture. Thus, the engine system injects, into an intake port of the engine, a blended fuel having a higher gasoline content than the fuel stored in the main tank. Consequently, the engine system disclosed in PATENT DOCUMENT 1 uses the fuel having a high gasoline content and stored in the sub-tank to increase the vaporization rate of the fuel, under such a running condition as to cause a decrease in the vaporization rate. Thus, the engine system ensures the ignitability and/or the combustion stability of the air-fuel mixture when the engine system is run cold.

On the other hand, PATENT DOCUMENT 2 discloses an FFV engine system without such a sub-tank. Instead, the engine system includes a fuel injection valve configured to directly inject a fuel into a cylinder. The engine system disclosed in PATENT DOCUMENT 2 increases a fuel pressure and injects the high-pressure fuel into a cylinder during the compression stroke at a cold start of the engine when the temperature of the engine and the vaporizability of the fuel are low and when the fuel has a high ethanol content and the fuel injection amount is large, in view of the fact that a theoretical air fuel ratio of ethanol is smaller than that of gasoline and the fact that the fuel injection amount needs to be increased when using a fuel having a high ethanol content than when using a fuel having a high gasoline content. With the increased fuel pressure, the fuel is atomized and the vaporization of the fuel is promoted. In addition, the timing of fuel injection is delayed, thereby starting combustion of the fuel before the injected fuel is caught on portions such as the inner wall and the piston of the cylinder. In this manner, the engine system disclosed in PATENT DOCUMENT 2 modifies the fuel injection modes so as to facilitate cold starting of the engine.

CITATION LIST

Patent Document

PATENT DOCUMENT 1: Japanese Patent Application No. 2010-133288.
PATENT DOCUMENT 2: Japanese Patent Application No. 2010-37968.

SUMMARY OF THE INVENTION

Technical Problem

The configuration that needs a sub-tank as disclosed in PATENT DOCUMENT 1 has two fuel feeding systems, which complicates, and increases the cost of, the engine system. Hence, there is a demand for a configuration without a sub-tank as disclosed in PATENT DOCUMENT 2. On the other hand, the ignitability and/or the combustion stability of the air-fuel mixture need to be ensured regardless of the properties of the fuel stored in the main tank.

As disclosed in PATENT DOCUMENT 2, ethanol and gasoline are different in theoretical air fuel ratio. Thus, as the ethanol content of a fuel increases, an even larger amount of the fuel needs to be injected, compared with gasoline.

Moreover, as described above, the vaporization rate of a fuel decreases as the temperature of the engine falls and as the ethanol content of the fuel rises. Thus, taking the low vaporization rate into consideration, the engine system provided for an FFV performs such a control as to obtain a desired amount of vaporized fuel by increasing in advance the amount of the fuel to be fed into a cylinder when the engine temperature is low and/or when the fuel ethanol content is high.

When an engine runs cold using E95 under a heavy load, for example, the amount of the fuel injected by a fuel injection valve per cycle increases due to a combination of the following factors: (i) the ethanol content of the fuel is so high that the amount of fuel required increases compared with gasoline, (ii) the engine needs to run under so heavy a load as to require more fuel correspondingly, and (iii) the vaporization rate decreases since the engine runs cold and the ethanol content is high, which makes it necessary to change the fuel amount by increasing it. As a result, the amount of the fuel to be injected has to be, for example, twice or more as much as when gasoline is used under the same running condition.

Meanwhile, as to the configuration disclosed in PATENT DOCUMENT 2 for injecting a fuel into a cylinder during the compression stroke, the fuel pressure should be set to be relatively high, since the fuel needs to be injected against a high pressure in the cylinder, and the fuel needs to be atomized so that the vaporization of the fuel is promoted. The fuel pressure is raised by an engine-driven high-pressure pump, for example. As described above, however, if the engine keeps running in the cold-running phase under a heavy load, which causes a significant increase in the amount of the fuel injected by the fuel injection valve, the high-pressure pump cannot raise the fuel pressure in time. As a result, the fuel pressure gradually decreases. The decrease in the fuel pressure affects the atomization of the fuel and decreases the vaporization rate of the fuel. The resultant torque will not match the amount of the fuel injected in the cylinder, thus deteriorating the fuel economy. Furthermore, the decrease in the fuel pressure increases the amount of the fuel left unburned, followed by deterioration in exhaust emission performance.

In view of the forgoing background, it is therefore an object of the present disclosure to provide a technique for avoiding affecting the atomization of a fuel and deteriorating the fuel economy when an engine is in a cold-running phase (i.e., when the engine is at or below a predetermined temperature) and under a heavy load (i.e., when the engine is under at least a predetermined load).

Solution to the Problem

The problem described above could be solved if, for example, a high-pressure pump having a larger capacity is adopted to maintain a high fuel pressure even if a relatively large amount of fuel continues to be injected. However, adopting such a large high-pressure pump inevitably causes new problems such as an increase in cost, a decrease in the layout flexibility of a small engine compartment, and a decline in fuel economy involved with driving such a high-pressure pump having a large capacity.

Thus, the present inventors have decided to lower the upper limit of the charging efficiency of the engine body as the vaporization rate of the fuel fed into the cylinder decreases, that is, as the amount of the fuel fed into the cylinder increases. To limit the maximum charging efficiency means limiting the maximum amount of the fuel to be fed into a cylinder. Hence, a high fuel pressure is successfully maintained even if the high-pressure pump has a relatively small capacity.

A technique specifically disclosed here relates to a control device for a spark-ignition engine. The control device for a spark-ignition engine comprises: an engine body configured to run with a fuel including an unconventional fuel, of which the vaporization rate is lower, at or below a specific temperature, than that of gasoline; a fuel feeder configured to feed the fuel into a cylinder provided for the engine body, the fuel having had its pressure raised to a predetermined pressure; and a controller configured to operate the engine body by controlling at least the fuel feeder.

The controller is configured (i) to feed the fuel through the fuel feeder into the cylinder when the cylinder is in an intake stroke and in a compression stroke and if the engine body is both in a cold-running phase and under a heavy load, and (ii) to lower an upper limit of the charging efficiency of the engine body as the vaporization rate of the fuel fed into the cylinder decreases, the engine body at or below a predetermined temperature being in the cold running phase, the load applied to the engine body being heavy when the engine body is under at least a predetermined load.

Here, the "unconventional fuel, of which the vaporization rate is lower, at or below a specific temperature, than that of gasoline" may be a single component fuel, for example. Specifically, examples of such unconventional fuels include alcohols such as ethanol and methanol. A specific example of the alcohol may be a biogenic alcohol such as bioethanol made from sugar cane or corn.

Moreover, the "fuel including an unconventional fuel" includes both a fuel that is a blend of the unconventional fuel and gasoline and a fuel consisting essentially of the unconventional fuel alone. The blend ratio of the unconventional fuel and gasoline is not particularly limited, and any given blend ratio may be adopted. The fuel to be fed to the engine body may have a constant blend ratio of the unconventional fuel and gasoline. Alternatively, the blend ratio may be changed as needed. If the unconventional fuel is ethanol, the "fuel including an unconventional fuel" includes a fuel having any ethanol content. Specifically, the fuel may fall within the range of E25 in which 25% of ethanol is blended with gasoline to E100 consisting 100% of ethanol. However, this definition does not necessarily exclude a possibility that a fuel with no such unconventional fuel is fed to the engine body. When the unconventional fuel is ethanol, for example, the fuel to be fed to the engine body includes a fuel having any ethanol content. Specifically, the fuel may fall within the range of gasoline (i.e., E0 including no ethanol) to E85 in which 85% of ethanol is blended with gasoline. Furthermore, the "fuel including an unconventional fuel" may contain water. Hence, E100 containing approximately 5% of water is also one of the "fuels including an unconventional fuel". Note that the alcohol content of the fuel may be detected or estimated by any of various methods.

The "vaporization rate" may be defined herein as a ratio by weight of the fuel contributing to combustion to the fuel fed into the cylinder. This vaporization rate may be calculated based on a detection value of an $O_2$ sensor attached to an exhaust passageway of the engine. Under a condition that the temperature of the engine body is at or below a predetermined temperature, the vaporization rate may decrease as the content of the unconventional fuel in the fuel increases or as the temperature of the engine body falls.

The "fuel feeder" may include at least a fuel tank which stores a fuel including an unconventional fuel, a high-pressure pump which raises the pressure of the fuel, and a fuel injection valve which injects the fuel with a raised pressure. The high-pressure pump may be configured to be driven by the engine body or by a power source provided separately from the engine body. For example, the high-pressure pump may be an electric pump. Furthermore, the fuel injection valve may directly inject the fuel into a cylinder. In addition to a fuel injection valve of such a direct injection type, the engine body may further include a fuel injection valve injecting the fuel into the intake port.

The situation where "the engine body is under a heavy load that is equal to or greater than a predetermined load" may be defined as a situation where the engine is running under a heavy load including a full load. The situation where "the engine body is running under a heavy load" may also be defined that the engine body is running in the heavy load range when the load range of the engine is evenly divided into two equal ranges (namely, a light load range and the heavy load range), or three ranges (namely, a light load range, a medium load range, and a heavy load range). Note that as will be described later, the upper limit of the charging efficiency of the engine body is lowered as the vaporization rate of the fuel fed into the cylinder decreases. Accordingly, the full load is changed.

The "charging efficiency" may be defined as follows. Specifically, the charging efficiency is the ratio of the weight of air sucked into one cylinder to the unity that is the weight of air for one cylinder out of the total displacement in the standard air (at 25° C., 1 atm).

According to the configuration described above, the controller feeds the fuel into a cylinder when the cylinder is in the intake stroke and when the cylinder is in the compression stroke in the cold-running phase in which the engine body is running at or below a predetermined temperature (i.e., at such a temperature as to cause a fuel with a high unconventional fuel content to have a decreased vaporization rate) and under a heavy load (i.e., when the load applied to the engine body is equal to or greater than a predetermined load, or when the amount of the fuel to be fed into the cylinder increases).

By feeding the fuel into the cylinder while the cylinder is in the compression stroke (i.e., by directly injecting the fuel into the cylinder), the vaporization of the fuel is successfully promoted by utilizing a rise in the temperature inside the cylinder through adiabatic compression to be produced as the compression stroke progresses. This is highly effective, because the vaporization of the fuel is promotable even when not so much fuel is vaporizable with the use of manifold vacuum since the engine body is under a heavy load.

Moreover, since the engine body is running under a heavy load, the amount of the fuel to be fed into a cylinder increases at a high relatively rate. In addition, since the engine body is in the cold-running phase, the amount of the fuel further increases, taking a low vaporization rate of the fuel into consideration. However, feeding the fuel in each of the intake and the compression strokes ensures not only a sufficiently long fuel-feeding period but also a sufficiently long air-fuel-mixture creating period, which is advantageous in the ignitability and combustion stability of the air-fuel mixture. In particular, it is effective to separately feed the fuel in the intake and compression stroke periods, since a sufficiently long fuel feeding period is ensured even when the fuel is needed in a larger amount than gasoline. This is because the unconventional fuel is alcohol and the alcohol content in the fuel is high.

Feeding the fuel in each of the intake and compression strokes in this manner allows for improving the vaporizability of the fuel and vaporizing a sufficiently large amount of fuel. Thus, compared with a configuration in which the fuel is fed through the intake stroke alone in cold-running phase under a heavy load, feeding in each of the strokes allows for a further increase in maximum charging efficiency and in maximum torque.

Furthermore, the controller lowers the upper limit of the charging efficiency of the engine body as the vaporization rate of the fuel fed into the cylinder decreases. In other words, when the vaporization rate of the fuel is low, the full load decreases, and therefore, the maximum amount of the fuel to be consumed decreases, too. This allows the fuel feeder to feed the fuel in a smaller amount even if the engine body continuously runs under a full load, and to successfully maintain a predetermined fuel pressure. Consequently, the atomization of the fuel is ensured, thus avoiding a decline in the vaporizability of the fuel. As a result, the torque to be obtained matches the amount of the fuel fed into the cylinder, which provides a measure for avoiding deterioration in fuel economy. Furthermore, the amount of the fuel left unburned decreases so much that the exhaust emission performance improves, too.

Here, the upper limit of the charging efficiency is lowered in the configuration described above, which places a constraint that the maximum torque decreases when the accelerator is fully depressed. However, as described above, the maximum charging efficiency is increased by feeding the fuel in each of the intake and compression strokes. Hence, even if the upper limit of the charging efficiency is lowered, relatively high charging efficiency is still ensured. In other words, the driving performance in the cold-running phase improves. Furthermore, the engine body here is running under a heavy load with the accelerator fully depressed, so that the temperature of the engine body rises quickly. The vaporization rate of the fuel increases with a rise in the temperature of the engine body. Hence, the upper limit of the charging efficiency is also needs be reset to be a higher value. Consequently, even if the maximum torque is limited at first, the limitation is immediately lifted.

Note that the lowered upper limit of the charging efficiency may be set to be 0.5 or more. For example, the upper limit may be set to 0.6 or more, or may even be set to be 0.7 or more. Such setting allows for ensuring a relatively high maximum torque while avoiding deterioration in fuel economy, thus contributing to obtaining high levels of fuel economy and driving performance in the cold-running phase.

The controller may lower the upper limit of the charging efficiency of the engine body as a content of the unconventional fuel increases in the fuel to be fed into the cylinder.

When the temperature of the engine body is low, the vaporization rate of a fuel decreases as the fuel includes a higher content of the unconventional fuel. Consequently, the higher the content of the unconventional fuel in the fuel is, the lower the upper limit of the charging efficiency of the engine body may be set to be, in order to avoid deterioration in fuel economy as described above.

The controller may lower the upper limit of the charging efficiency of the engine body as the temperature of the engine body falls.

The vaporization rate of a fuel including an unconventional fuel decreases as the temperature of the engine body falls. Hence, the lower the temperature of the engine body is, the lower the upper limit of the charging efficiency of the engine body may be set. This contributes to avoiding deterioration in fuel economy as described above.

The control device for a spark-ignition engine may further comprise a throttle valve configured to adjust an amount of fresh air to be charged into the cylinder. The controller may be configured to: receive information about a position of the accelerator, and adjust an opening of the throttle valve according to the position of the accelerator; and change the opening of the throttle valve with predetermined control responsiveness to a change in the position of the accelerator, and lower an upper limit of the opening of the throttle valve as the vaporization rate of the fuel, fed into the cylinder, decreases if the engine body is both in the cold-running phase in which the engine body is at or below the predetermined temperature, and under the heavy load that is equal to or greater than a predetermined load In this configuration, the controller lowers the upper limit of the opening of the throttle valve under a particular condition that the engine body is both (i) in the cold-running phase when its temperature is at or below a predetermined temperature and (ii) under the heavy load that is equal to or greater than a predetermined load. This allows for lowering the upper limit of the charging efficiency of the engine body. Moreover, the controller changes the opening of the throttle valve with predetermined control responsiveness to a change in accelerator pedal position. Here, the "predetermined control responsiveness" may be defined under a different condition from the particular condition in the cold-running phase under the heavy load. That is to say, the "predetermined control responsiveness" here is not unique control responsiveness under a particular condition in the cold-running phase under a heavy load. Instead, the term "predetermined control responsiveness" may be considered synonymous with ordinary control responsiveness.

In the configuration described above, the opening of the throttle valve is changed with predetermined control responsiveness to a change in accelerator pedal position. Hence, the opening of the throttle valve is controlled with ordinary control responsiveness to the driver's operation of the accelerator pedal. Consequently, the control between the operation of the accelerator pedal and the change in the throttle valve opening is substantially the same as normal control unless neither the accelerator position nor the charging efficiency reaches their respective upper limits. This contributes to reduction of uncomfortable feeling which the driver might experience during driving, and improvement in the drivability of the vehicle.

Furthermore, when the accelerator pedal is fully depressed, the maximum torque decreases since the upper limit of the charging efficiency is limited. However, the opening of the throttle valve is changed with normal control responsiveness. This enables reducing the loss of the sense of linear acceleration.

Here, when the engine body is in cold-running phase in which the temperature of the engine body is at or below a predetermined temperature, and the vaporization rate of the fuel is low, another type of control could be performed to make the responsiveness of a change in the opening of the throttle valve to a change in accelerator position lower than usual. Such a control reduces the amount of the fuel required with respect to the accelerator position, thus allowing for avoiding a decrease in fuel pressure as described above. However, such a control as to decrease the responsiveness of the change in the opening of the throttle valve to the change in the accelerator position results in failure to increase the torque quickly enough as the driver depresses the accelerator pedal. This will make the driver feel a significant loss of the sense of linear acceleration. Moreover, when the engine body is running in a regular speed range in which the engine body runs under a light or medium load, the torque also fails to increase quickly enough as the driver depresses the accelerator pedal. This makes the driver feel uncomfortable.

In contrast, according to the configuration described above, only the maximum torque is limited when the vaporization rate of the fuel is low in the cold-running phase in which the temperature of the engine body is at or below a predetermined temperature. Hence, in this case, the control to be performed normally is no different from the control in the regular speed range, which does not make the driver feel uncomfortable. In addition, this also prevents the driver from feeling the loss of the sense of linear acceleration, which is beneficial, too.

Advantages of the Invention

As can be seen from the foregoing description, the control device of the spark-ignition engine feeds a fuel into a cylinder in each of the intake stroke and the compression stroke in the cold-running phase (i.e., when the engine body is at or below than a predetermined temperature) and under a heavy load (i.e., when the load applied to the engine body is equal to or greater than a predetermined load). This thus enables improving the vaporizability of the fuel and greatly enhancing the maximum charging efficiency even under a condition that a relatively large amount of fuel is fed. Furthermore, the control device lowers the upper limit of the charging efficiency of the engine body as the vaporization rate of the fuel fed into the cylinder decreases. This enables keeping the pressure of the fuel high enough to avoid deterioration in fuel economy. Moreover, even though the upper limit of the charging efficiency is lowered, the control device feeds the fuel in the intake and compression strokes to enhance the maximum charging efficiency. This makes the limited charging efficiency relatively high, thus improving the drivability of a vehicle in the cold-running phase.

DESCRIPTION OF EMBODIMENT

Figure 1:
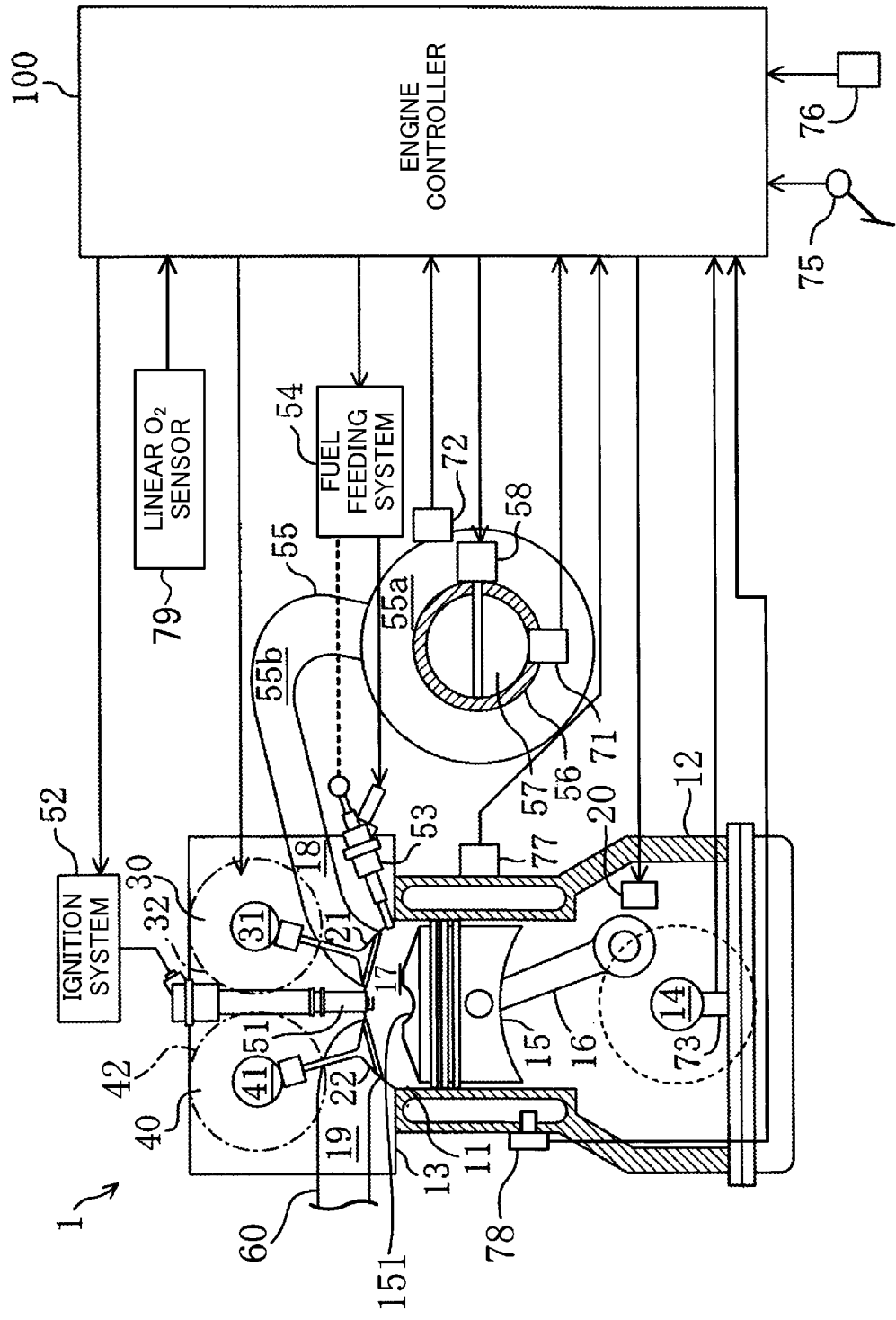
FIG. 1 generally illustrates a configuration of a spark-ignition engine and its control device.

Described below with reference to the drawings is an embodiment of a spark-ignition engine. Note that the preferred embodiments to be described below are only examples. As illustrated in FIG. 1, an engine system includes: an engine (i.e., an engine body) 1; various actuators attached to the engine 1; various sensors; and an engine controller 100 which controls the actuators in response to signals supplied from the sensors. The engine 1 of this engine system has a high compression ratio (e.g., a geometric compression ratio of 12 to 1 through 20 to 1 (e.g., 12 to 1)).

The engine 1 is a spark-ignition and four-stroke internal combustion engine, and includes four cylinders 11 (i.e., a first to fourth cylinders) which are arranged in line. FIG. 1 illustrates only one of the four cylinders. Note that an engine, to which the technique disclosed herein is applicable, shall not be limited to such a four-cylinder in-line engine. The engine 1 is mounted on a vehicle such as an automobile, and has an output shaft (not shown) connected through a transmission to drive wheels. The vehicle is propelled when the power generated by the engine 1 is transmitted to the drive wheels.

This engine 1 is fed with a fuel including ethanol (such as bioethanol). In particular, this vehicle is an FFV which can run with a fuel including any ethanol content falling within the range of 25% (i.e., E25 having a gasoline content of 75%) to 100% (i.e., E100 including no gasoline at all). E100 here may include water-containing ethanol with approximately 5% of water that has not been sufficiently removed through the distillation processes of ethanol which is still left there. Note that the technique disclosed herein shall not be limited to an FFV that is supposed to use E25 to E100. The same technique is also applicable to an FFV running with a fuel, of which the ethanol content falls within the range of, for example, E0 (i.e., consisting of gasoline alone and including no ethanol at all) to E85 (i.e., a blend of an 85% ethanol and 15% gasoline).

Although not shown, this vehicle includes a fuel tank that stores the fuel described above (i.e., a main tank) only. That is to say, a feature of this vehicle is that unlike a conventional FFV, this vehicle has no other sub-tanks to store, separately from the main tank, a fuel with a high gasoline content. This FFV is built based on a gasoline-powered vehicle which runs only with gasoline. The FFV and the gasoline-powered vehicle share most of their configuration.

The engine 1 includes a cylinder block 12 and a cylinder head 13 mounted on the cylinder block 12. The cylinder block 12 has the cylinder 11 inside. As in the known art, the cylinder block 12 has a crankshaft 14 rotatably supported by a journal, a bearing and other members. This crankshaft 14 is interlocked through a connecting rod 16 with a piston 15.

Each cylinder 11 has a ceiling portion with two ramps formed to extend from an approximately middle portion of the ceiling portion to the vicinity of the bottom end face of the cylinder head 13, and the ramps lean toward each other to form a roof-like structure. This shape is what is called a "pentroof".

Each piston 15 is slidably inserted into a corresponding cylinder 11, and defines a combustion chamber 17 along with the cylinder 11 and the cylinder head 13. The top face of the piston 15 is raised from its periphery portion toward its center portion to form a trapezoid corresponding to the pentroof shape on the ceiling face of the cylinder 11. This shape reduces the volume of the combustion chamber when the piston 15 arrives at the top dead center, and achieves as high a geometric compression ratio as 12 to 1 or more. The top face of the piston 15 has, approximately at its center, a cavity 151 which is an approximately spherical depression. The cavity 151 is positioned to face a spark plug 51 arranged in the center portion of the cylinder 11. This cavity 151 contributes to shortening one combustion period. In other words, as described above, this engine 1 having a high compression ratio has the piston 15, of which top face is raised. The engine 1 is configured so that, when the piston 15 arrives at the top dead center, the gap between the top face of the piston 15 and the ceiling face of the cylinder 11 becomes very narrow. If the cavity 151 were not formed, an initial flame would interfere with the top face of the piston 15, thus causing an increase in cooling loss, disturbing flame propagation, and resulting in a decrease in combustion speed. In contrast, this cavity 151 avoids interfering with the initial flame, and does not prevent the initial flame from growing. As a result, the flame propagation increases and the combustion period shortens. As to a fuel having a high gasoline content, such features are advantageous in reducing knocking, and contribute to an increase in torque due to advanced ignition timing.

An intake port 18 and an exhaust port 19 are provided on the cylinder head 13 of each cylinder 11, and each communicate with the combustion chamber 17. An intake valve 21 and an exhaust valve 22 are arranged to respectively shut off (i.e., close) the intake port 18 and the exhaust port 19 with respect to the combustion chamber 17. The intake valve 21 and the exhaust valve 22 are respectively driven by an intake valve driving mechanism 30 and an exhaust valve driving mechanism 40. The driven valves reciprocally move at predetermined timings to open and close the intake and exhaust ports 18 and 19.

The intake valve driving mechanism 30 and the exhaust valve driving mechanism 40 respectively include an intake camshaft 31 and an exhaust camshaft 41. The camshafts 31 and 41 are interlocked with the crankshaft 14 via a power transmission mechanism such as a known chain/sprocket mechanism. As known in the art, the power transmission mechanism rotates the camshafts 31 and 41 once while the crankshaft 14 rotates twice.

The intake valve driving mechanism 30 includes a variable intake valve timing mechanism 32 which can change the opening and closing timings of the intake valve 21. The exhaust valve driving mechanism 40 includes a variable exhaust valve timing mechanism 42 which can change the opening and closing timings of the exhaust valve 22. In this embodiment, the variable intake valve timing mechanism 32 includes a hydraulic, mechanical, or electric variable valve timing (VVT) mechanism which enables continuously changing the phase of the intake camshaft 31 within a predetermined range of angles. The variable exhaust valve timing mechanism 42 includes a hydraulic, mechanical, or electric VVT mechanism which enables continuously changing the phase of the exhaust camshaft 41 within a predetermined range of angles. The variable intake valve timing mechanism 32 changes the closing timing of the intake valve 21 to adjust an effective compression ratio. Note that the effective compression ratio refers herein to the ratio of the combustion chamber volume when the intake valve is closed to the combustion chamber volume when the piston 15 is at the top dead center.

The spark plug 51 is attached to the cylinder head 13 with screwing or any other known fixing structure. The spark plug 51 has an electrode aligned with approximate the center of the cylinder 11 and facing the ceiling portion of the combustion chamber 17. In response to a control signal from the engine controller 100, an ignition system 52 supplies an electric current to the spark plug 51 so that the spark plug 51 produces a spark at any desired ignition timing.

Using a bracket or any other known fixing member, a fuel injection valve 53 is attached to one side (i.e., to the intake side in FIG. 1) of the cylinder head 13 in this embodiment. This engine 1 directly injects fuel into the cylinder 11. In other words, the engine 1 is a so-called "direct-injection engine". The fuel injection valve 53 has a tip positioned below the intake port 18 in the vertical direction, and at the center of the cylinder 11 in the horizontal direction. The tip protrudes into the combustion chamber 17. Note that the arrangement of the fuel injection valve 53 shall not be limited to this. In this example, the fuel injection valve 53 is a multi-hole injector (i.e., MHI) having six holes. Regarding the orientation of each hole (not shown), the tip of the injector hole expands toward its end so that the fuel is injected throughout the space inside the cylinder 11. The MHI is beneficial in that (i) the injector has multiple holes and each hole has a small diameter, which enables injecting the fuel with a relatively high pressure, and (ii) the injector injects the fuel throughout the space inside the cylinder 11, which enables mixing the fuel better and enhancing the vaporization and atomization of the fuel. Hence, injecting the fuel during the intake stroke is beneficial in terms of mixing the fuel and promoting the vaporization and atomization of the fuel by utilizing an intake flow in the cylinder 11. On the other hand, injecting the fuel during the compression stroke is beneficial in terms of cooling the gas in the cylinder 11, because the vaporization and atomization of the fuel are promoted. Note that the fuel injection valve 53 does not have to be the MHI.

A fuel feeding system 54 includes a high-pressure pump which raises the pressure of the fuel and supplies the high-pressure fuel to the fuel injection valve 53, members such as a pipe and a hose which send the fuel from a fuel tank to the high-pressure pump, and an electric circuit which drives the fuel injection valve 53. Note that the illustration of their configuration is omitted herein. In this example, the high-pressure pump is driven by the engine 1. Optionally, the high-pressure pump may be an electric pump. The high-pressure pump has a relatively small capacity, as in a gasoline-powered vehicle. If the fuel injection valve 53 is an MHI, the fuel injection pressure is set to be relatively high since the fuel is injected through small holes. The electric circuit activates the fuel injection valve 53 in response to a control signal from the engine controller 100, and makes the fuel injection valve 53 inject a desired amount of the fuel into the combustion chamber 17 at a predetermined timing. Here, the fuel feeding system 54 raises the fuel pressure as the number of revolutions of the engine revolution increases. Raising the fuel pressure increases the amount of fuel to be injected into the cylinder 11 with an increase in the number of revolutions of the engine. However, the high fuel pressure is advantageous in terms of the vaporization and atomization of the fuel. Besides, in the high fuel pressure also narrows the pulse width as much as possible for the fuel injection of the fuel injection valve 53. The highest fuel pressure may be 20 MPa, for example. As described above, the fuel tank stores an alcohol-containing fuel with any arbitrary ethanol content falling within the range of E25 to E100.

The intake port 18 communicates with a surge tank 55*a* via an intake passageway 55*b* in an intake manifold 55. The airflow from an air cleaner (not shown) is supplied to the surge tank 55*a* via a throttle body 56. The throttle body 56 is provided with a throttle valve 57. As known in the art, this throttle valve 57 reduces the airflow running into the surge tank 55*a*, and controls its flow rate. In response to a control signal supplied from the engine controller 100, a throttle actuator 58 adjusts the opening of the throttle valve 57.

As known in the art, the exhaust port 19 communicates with a passage in an exhaust pipe via an exhaust passageway in an exhaust manifold 60. This exhaust manifold 60 includes first collectors and a second collector (not shown). Each of the first collectors collects individual branch exhaust passageways connected to the respective exhaust ports 19 of the cylinders 11, so that the collected individual exhaust passageways are not neighboring one another in exhausting order. The second collector collects intermediate exhaust passageways provided downstream of the first collectors. That is to say, the exhaust manifold 60 of this engine 1 adopts a so-called "4-2-1 pipe layout".

The engine 1 further includes a starter motor 20 for cranking the engine 1 at its start.

The engine controller 100 is a controller based on a known microcomputer. The engine controller 100 includes a central processing unit (CPU) which executes a program, a memory, such as a random access memory (RAM) or a read-only memory (ROM), which stores a program and data, and an input-output (I/O) bus through which an electric signal is input and output.

The engine controller 100 receives various inputs including: the flow rate and temperature of an intake airflow from an airflow sensor 71; an intake manifold pressure from an intake pressure sensor 72; a crank angle pulse signal from a crank angle sensor 73; an engine coolant temperature from a coolant temperature sensor 78; and an oxygen concentration in the exhaust gas from a linear $O_2$ sensor 79 attached to an exhaust passageway. The engine controller 100 calculates the number of revolutions of the engine based on, for example, a crank angle pulse signal. Moreover, the engine controller 100 receives an accelerator position signal from an accelerator position sensor 75 which detects an accelerator pedal travel. Furthermore, the engine controller 100 receives a vehicle speed signal from a vehicle speed sensor 76 which detects a rotation speed of the output shaft of the transmission. In addition, the cylinder block 12 is further provided with a knocking sensor 77 including an acceleration sensor transforming vibrations of the cylinder block 12 into a voltage signal, and outputs the voltage signal to the engine controller 100.

Based on these inputs, the engine controller 100 calculates the following control parameters for the engine 1. Examples of the control parameters include a desired throttle opening signal, fuel injection pulse, ignition signal, and phase angle signal of a valve. The engine controller 100 then outputs those signals to the throttle actuator 58, the fuel feeding system 54, the ignition system 52, the variable intake valve timing mechanism 32, the variable exhaust valve timing mechanism 42 and other members. At the start of the engine 1, the engine controller 100 further outputs a drive signal to the starter motor 20.

Here, as a configuration unique to an FFV engine system, the engine controller 100 estimates the ethanol content of the fuel to be injected by the fuel injection valve 53, based on the result of detection by the linear $O_2$ sensor 79. The theoretical air fuel ratio of ethanol (9.0) is smaller than that of gasoline (14.7). The higher the ethanol content of the fuel is, the richer the theoretical air fuel ratio is (i.e., the lower the theoretical air fuel ratio is). If unburned oxygen is left in the exhaust gas under the condition that the engine is run at the theoretical air fuel ratio, a determination may be made that the ethanol content of the fuel is higher than expected. Specifically, refueling the vehicle could change the ethanol content of the fuel that the fuel injection valve 53 injects (i.e., the ethanol content of the fuel stored in the fuel tank). Thus, the engine controller 100 first determines, based on a detection value obtained by a level gauge sensor of the fuel tank, whether the vehicle has been refueled. If the answer is YES, the engine controller 100 estimates the ethanol content of the fuel. Based on the output signal of the linear $O_2$ sensor 79, the engine controller 100 estimates an ethanol content in the fuel. Specifically, if the air fuel ratio is lean, the engine controller 100 determines that the fuel contains more gasoline. On the other hand, if the air fuel ratio is rich, the engine controller 100 determines that the fuel contain more ethanol. Note that a sensor may be provided to detect the ethanol content of the fuel, instead of estimating the ethanol content of the fuel. The ethanol content thus estimated is used for not only controlling fuel injection but also controlling the charging efficiency adjustment, as will be described later.

The engine controller 100 further calculates the vaporization rate of the fuel fed into the cylinder 11, based on the result of detection by the linear $O_2$ sensor 79. The vaporization rate is defined as the ratio by weight of the fuel contributing to combustion to the fuel fed into the cylinder (i.e., the amount of the fuel injected by the fuel injection valve 53). The engine controller 100 calculates the weight of the fuel contributing to the combustion based on the air fuel ratio of the air-fuel mixture and the detection value obtained by the linear $O_2$ sensor 79, and calculates the vaporization rate based on the calculated fuel weight and the amount of the fuel injected by the fuel injection valve 53. The vaporization rate thus calculated is also used for controlling the charging efficiency adjustment, as will be described later.

(Controlling Engine in Cold-Running Phase Under High Load)

Figure 2:
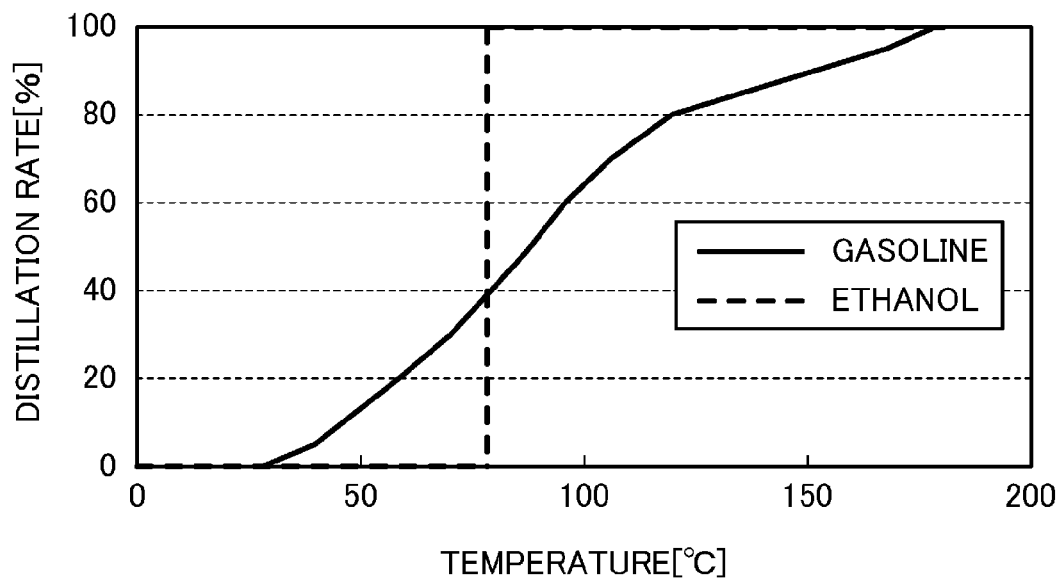
FIG. 2 shows, in comparison, how the respective distillation ratios of gasoline and ethanol change with the temperature.

As described above, this engine system is mounted on an FFV. The engine 1 is fed with an alcohol-containing fuel, with any arbitrary ethanol content falling within the range of E25 to E100. FIG. 2 shows, in comparison, the respective vaporizabilities of gasoline and ethanol. Note that FIG. 2 shows how the distillation ratios (%) of gasoline and ethanol each change as the temperature varies under the atmospheric pressure. Gasoline is a multicomponent fuel, and evaporates in accordance with the boiling point of each component. The distillation ratio of gasoline changes approximately linearly with the temperature. Thus, some components of gasoline may vaporize to create combustible air-fuel mixture, even if the temperature of the engine 1 is relatively low.

In contrast, ethanol is a single component fuel, and its distillation ratio becomes 0% at or below a specific temperature (i.e., 78° C. that is the boiling point of ethanol). On the other hand, its distillation ratio reaches 100% once the specific temperature is exceeded. Hence, the comparison between gasoline and ethanol shows that ethanol has a lower distillation ratio than gasoline at or below the specific temperature. However, ethanol tends to have a higher distillation ratio than gasoline, once the specific temperature is exceeded. Thus, when the engine 1 is in the cold-running phase, i.e., when the temperature of the engine 1 is at or below a predetermined temperature (e.g., when the coolant temperature is less than approximately 20° C.), a fuel containing ethanol has a lower vaporization rate than gasoline. Consequently, when the engine 1 is in the cold-running phase, the vaporization rate of the fuel decreases as the temperature of the engine 1 falls and as the ethanol content of the fuel increases.

As can be seen, the vaporization rate of the fuel changes depending on the temperature of the engine 1 and the ethanol content of the fuel. Thus, in order to achieve a target amount of vaporized fuel, the engine controller 100 makes, in accordance with the vaporization of the fuel, augmenting correction to a basic fuel amount to be set based on, for example, an engine load and an alcohol content. In other words, the amount of the fuel to be injected by the fuel injection valve 53 is augmented as the vaporization rate of the fuel decreases. Hence, when the engine 1 is in the cold-running phase under heavy load, more fuel is consumed due to the heavy load, and the magnitude of the augmenting correction to be made increases since the vaporization rate of the fuel is low. As a result, an extremely large amount of the fuel may be injected by the fuel injection valve 53. Moreover, since ethanol has a smaller theoretical air fuel ratio than gasoline, the amount of the fuel to be injected increases as the ethanol content in the fuel rises.

Figure 3:
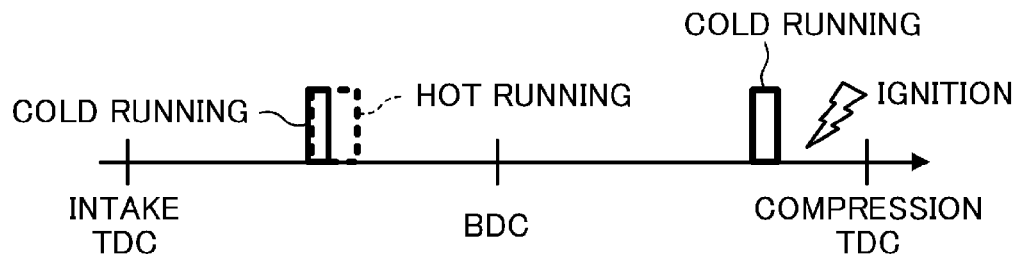
FIG. 3 indicates, in comparison, respective timings of fuel injection in cold- and warm-running phases under a heavy load.

FIG. 3 indicates an exemplary fuel injection timing when the engine 1 is running under a heavy load. Note that FIG. 3 conceptually indicates the fuel injection timing, and does not show a fuel injection period. In the cold-running phase, i.e., when the coolant temperature of the engine 1 is at or below a predetermined temperature (e.g., less than approximately 20° C. as described above) and the amount of the fuel to be injected increases significantly as the vaporization rate of the fuel declines, the engine controller 100 injects the fuel into the cylinder 11 during each of the intake and compression strokes as indicated by the solid lines in FIG. 3.

In contrast, from a warm-up phase to a hot-running phase, i.e., when the coolant temperature of the engine 1 exceeds the predetermined temperature, so that the vaporization rate of the fuel increases and the amount of the fuel to be injected decreases comparatively, the engine controller 100 injects the fuel into the cylinder 11 only during the intake stroke, as indicated by the dashed lines in FIG. 3.

Figure 4:
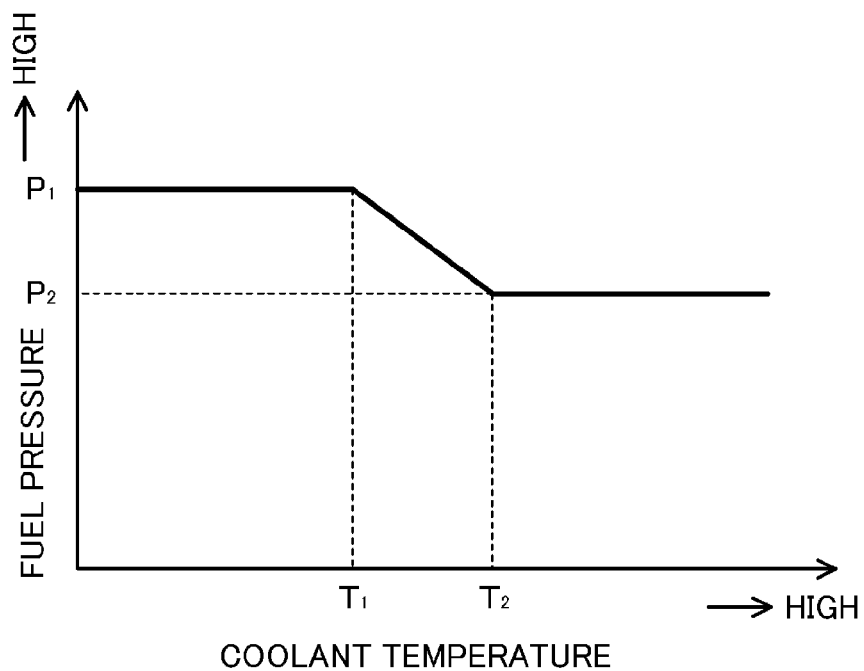
FIG. 4 illustrates an exemplary change in fuel pressure with the temperature of an engine coolant.

Meanwhile, FIG. 4 shows how the fuel pressure changes with a coolant temperature of the engine 1. When the coolant temperature of the engine 1 is at or below $T_1$ (of e.g., 0° C.), the engine controller 100 sets the fuel pressure to be $P_1$ (of e.g., 20 MPa) through the fuel feeding system 54. On the other hand, when the coolant temperature of the engine 1 exceeds $T_2$ (of e.g., 10° C.), the engine controller 100 sets the fuel pressure to be $P_2$ (of e.g., 17 MPa). When the coolant temperature of the engine 1 is between $T_1$ and $T_2$, the engine controller 100 makes the fuel feeding system 54 linearly change the fuel pressure from $P_1$ to $P_2$ as the engine coolant temperature changes. Note that the property of the fuel pressure shall not be limited to the one illustrated in FIG. 4. For example, the fuel pressure may be set to be $P_1$ when the coolant temperature of the engine 1 is at or below a predetermined temperature. On the other hand, the fuel pressure may be set to be $P_2$ when the coolant temperature exceeds the predetermined temperature.

Compression stroke injection promotes the vaporization of the fuel by utilizing the temperature inside the cylinder 11 which rises in association with adiabatic compression during the compression stroke. As described above, this engine 1 is very advantageous in vaporizing the fuel thanks to its high compression end temperature due to the high geometric compression ratio. For example, during the compression stroke injection, the injection of the fuel into the cylinder 11 may be delayed until the temperature and pressure within the cylinder 11 reach such levels at which the ethanol is ready to evaporate. This allows the ethanol to vaporize immediately after having been injected into the cylinder 11. For example, the fuel may be injected into the cylinder 11 during the second half of the compression stroke (i.e., the second half of the compression stroke when the compression stroke is virtually divided into the first and second halves). It is recommended that a sufficiently long period be provided for creating an air-fuel mixture between the end point of the fuel injection and the timing of ignition. Thus, the fuel injection may be started during the first half of the compression stroke or during the intake stroke if the fuel injection amount so large as to take a long the fuel injection period.

Moreover, the atomization of the fuel is promoted through an increase in the fuel pressure when the temperature of the engine 1 is low. This thus works favorably in enhancing the vaporizability of the fuel. Furthermore, a higher fuel pressure makes the injection period shorter when the same amount of fuel is injected. This is advantageous in shortening the injection period in the cold-running phase when the fuel injection amount is relatively large.

As described above, the fuel injection amount is corrected by augmentation, considering that the vaporization rate decreases when the engine 1 is in the cold-running phase. In this case, the compression stroke injection alone might not be able to ensure a sufficient fuel injection period. Hence, through the fuel injection valve 53, the engine controller 100 also injects the fuel during the intake stroke in addition to during the compression stroke. This operation ensures a sufficiently long fuel injection period. Moreover, the intake stroke injection is advantageous in homogenizing the air-fuel mixture, utilizing a strong intake flow. In addition, injecting the fuel into the cylinder 11 during the intake stroke ensures a sufficiently long period for creating the air-fuel mixture. Thus, it is of an extreme advantage to combine the intake stroke injection with the compression stroke injection, which excels in improvement in vaporization of the fuel, in order to improve the ignitability and combustion stability of the air-fuel mixture.

The intake stroke injection is advantageous in vaporizing the fuel because of the flash-boiling effect caused by manifold vacuum if the load of the engine 1 falls within a relatively low range. In this case, however, the engine 1 is running under a heavy load with a low manifold vacuum, and the vaporization of the fuel by the flash-boiling effect is hardly expectable. Hence, executing the compression stroke injection while the engine 1 is in the cold-running phase under a heavy load is advantageous in successfully vaporizing the fuel when the manifold vacuum cannot be utilized.

Note that if an engine is equipped only with a fuel injection valve for injecting fuel into the intake port, for example, such an engine can execute no stroke injection but the intake stroke injection. Such an engine has no choice but to utilize manifold vacuum to ensure vaporization of the fuel when the engine is in the cold-running phase under a heavy load in which the vaporization rate of the fuel decreases. Hence, for example, the opening of the throttle valve 57 is decreased to increase the manifold vacuum. In other words, when the engine is configured to execute only the intake stroke injection during the cold-running phase under a heavy load, the charging efficiency is significantly limited, and so is the maximum torque accordingly.

In contrast, the engine 1 of the present application carries out both the intake stroke injection and the compression stroke injection in the cold-running phase under a heavy load, and, as described above, ensures the vaporization of the fuel by the compression stroke injection. Thus, there is no longer any need for increasing the manifold vacuum. Consequently, the engine 1 successfully eliminates the constraint on the maximum charging efficiency, which would otherwise be satisfied to ensure the manifold vacuum, and increases its maximum torque. Optionally, in addition to the fuel injection valve 53 for direct injection, the engine 1 may further include a fuel injection valve injecting the fuel into the intake port.

In the hot-running phase of the engine 1, the vaporization rate becomes relatively high, regardless of the ethanol content of the fuel, compared with the cold-running phase in which the engine 1 carries out the intake stroke injection and the compression stroke injection. Hence, there is less need for increasing the vaporization rate by compression stroke injection. Thus, the fuel is injected only during the intake stroke. This allows for using the intake flow and ensuring a sufficiently long period for creating the air-fuel mixture, which thus contributes to homogenizing the air-fuel mixture. Consequently, the combustion stability increases. Note that the hot-running phase in which the vaporizability of the fuel improves eliminates the need for high fuel pressure, and the fuel pressure may be decreased comparatively. This allows for reduction in the mechanical resistance of the engine, and brings an advantage in improving fuel economy.

Besides, in the cold-running phase under a heavy load, this engine system thus lowers the upper limit of the charging efficiency as the vaporization rate of the fuel decreases (i.e., the engine system lowers the maximum charging efficiency). This is equivalent to decreasing the maximum opening of throttle valve 57.

Figure 5:
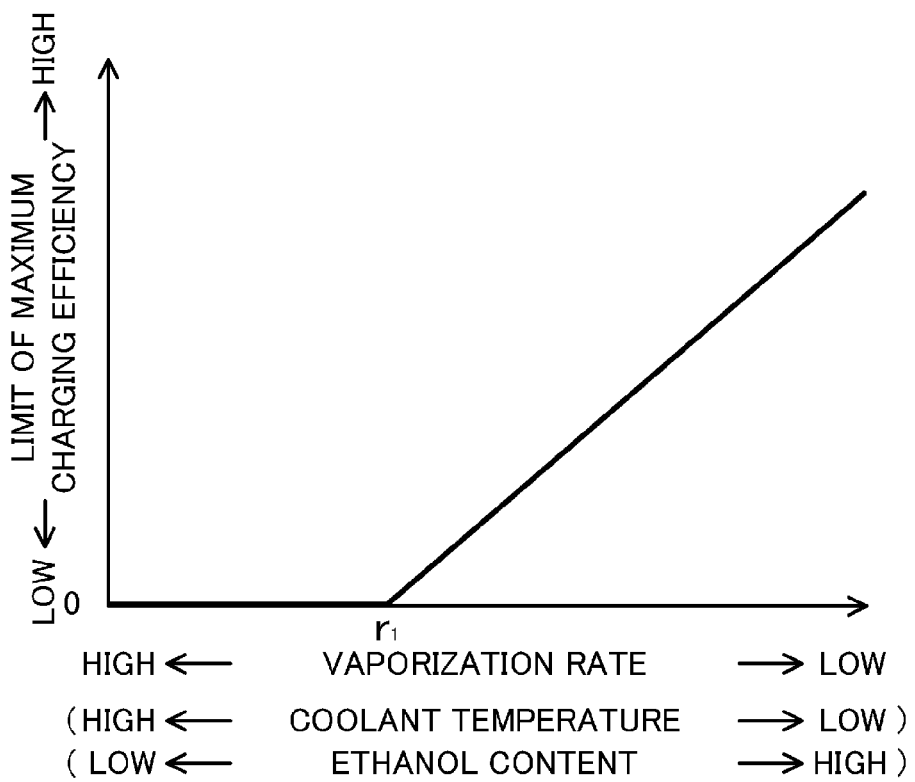
FIG. 5 illustrates an exemplary limit of the maximum charging efficiency with respect to the vaporization rate of a fuel.

FIG. 5 shows an exemplary limit to the maximum charging efficiency with respect to the vaporization rate of the fuel. This relational expression is defined in advance based on, for example, results of experiments and stored in the engine controller 100. A limit to the maximum charging efficiency may also be called a decrease in the maximum charging efficiency. Placing a high limit to the maximum charging efficiency is equivalent to setting a low maximum charging efficiency. Placing a low limit, and a limit of zero, to the maximum charging efficiency are respectively equivalent to setting a high maximum charging efficiency and setting no limit to the maximum charging efficiency. The relational expression shown as an example in FIG. 5 shows that the limit to the maximum charging efficiency is set to be zero when the vaporization rate exceeds a predetermined rate $r_1$. On the other hand, the limit to the maximum charging efficiency is increased as the vaporization rate decreases if the vaporization rate is equal to or lower than the predetermined rate $r_1$. As described above, the vaporization rate of the fuel is low when the temperature of the engine 1 is low. In other words, the relational expression in FIG. 5 indicates that the limit to the maximum charging efficiency is set to be zero when the coolant temperature of the engine 1 exceeds a predetermined temperature. On the other hand, the limit to the maximum charging efficiency is raised as the coolant temperature falls when the coolant temperature is at or below a predetermined temperature. Moreover, the vaporization rate of the fuel decreases as the ethanol content of the fuel is higher at a low temperature. Hence, in still other words, the limit to the maximum charging efficiency is set to be zero when the ethanol content of the fuel is below a predetermined level. On the other hand, the limit to the maximum charging efficiency is raised as the ethanol content rises when the ethanol content is equal to or higher than a predetermined level.

By lowering the upper limit of the maximum charging efficiency as described above, the maximum torque obtained when the accelerator is fully depressed may be limited. However, the amount of the fuel to be injected by the fuel injection valve 53 is successfully reducible instead. This enables curbing the reduction in fuel pressure to avoid deterioration of not only fuel economy but also exhaust emission performance as well.

In other words, as described above, the fuel injection amount increases in the cold-running phase under a heavy load, partly because the vaporization rate decreases due to a low temperature. In particular, the fuel injection amount further increases when the fuel contains more ethanol than gasoline. As a result, the amount of the fuel injected by the fuel injection valve 53 during one cycle increases significantly. Hence, that extremely large amount of the fuel continues to be injected when the engine 1 continues to run under a full load. On the other hand, as described above, the engine-driven high-pressure pump in the fuel feeding system 54 has a relatively small capacity. Thus if the extremely large amount of fuel continues to be injected, the high-pressure pump cannot raise the fuel pressure in time. As a result, the fuel pressure gradually decreases. The decrease in the fuel pressure affects the atomization and vaporizability of the fuel. As a result, the combustibility decreases and the engine fails to generate as much torque as what should be obtained from the amount of the fuel injected.

In contrast, if the upper limit to the maximum charging efficiency is lowered, the maxim amount of the fuel decreases even if the engine 1 runs at a full load. Hence, a high fuel pressure is successfully maintained even if the high-pressure pump has a relatively small capacity. As a result, the decrease in combustibility is avoided, which enables avoiding fuel economy deterioration and exhaust emission performance deterioration, because the amount of unburned fuel decreases.

Figure 6:
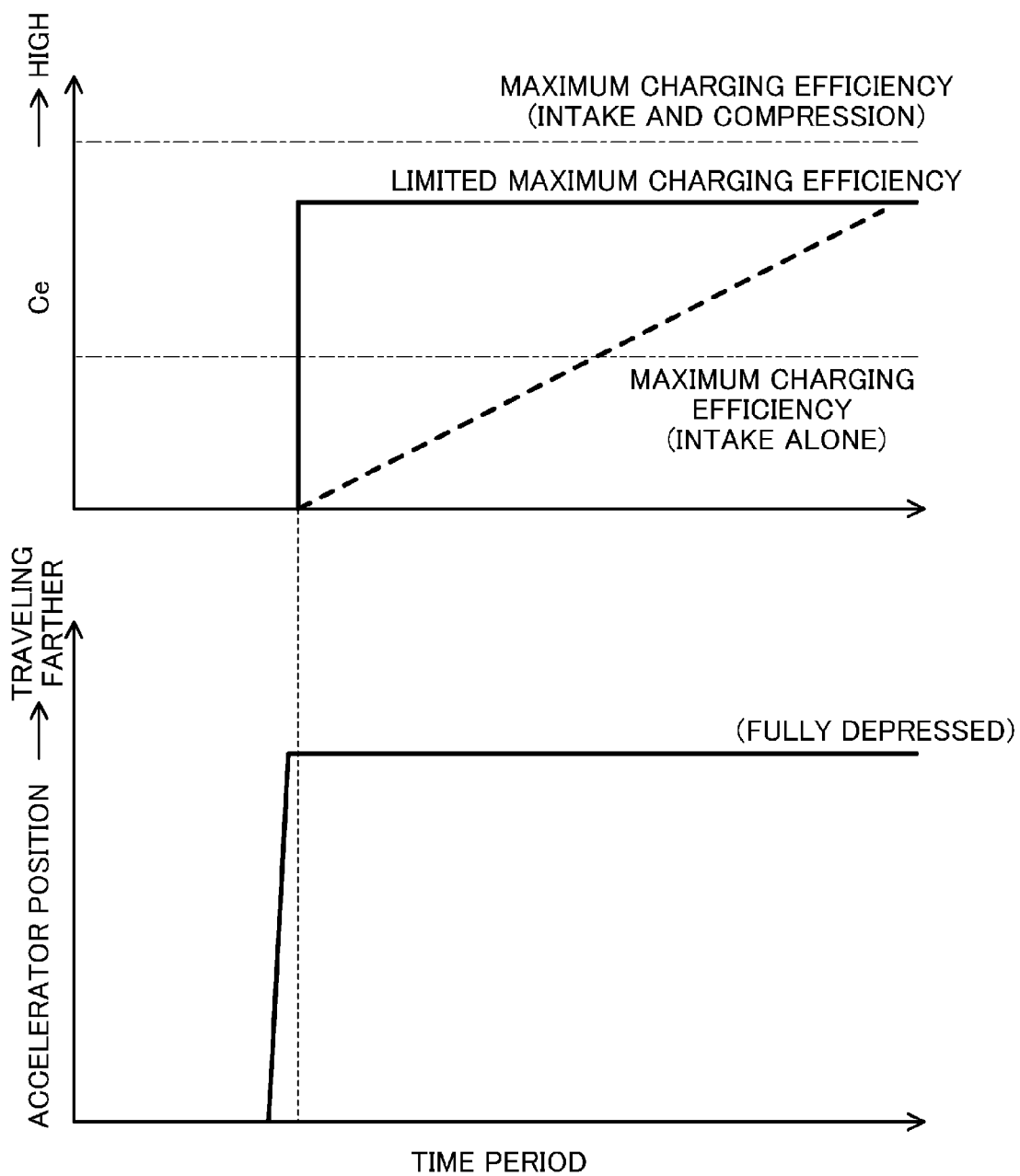
FIG. 6 is a timing diagram showing how the charging efficiency changes when an accelerator pedal is fully depressed.

Next, it will be described in further detail below with reference to the timing diagram shown in FIG. 6 how to control the engine in the cold-running phase under a heavy load. FIG. 6 illustrates an exemplary change in accelerator position when the accelerator is fully depressed in the cold-running phase of the engine 1 (see the lower graph in FIG. 6), and a corresponding change in charging efficiency (see the upper graph in FIG. 6). This corresponds to the situation where the driver fully depresses the accelerator pedal when the vehicle is at a stop after the engine has had a cold start. In the upper graph in FIG. 6, the one-dot chain indicates the maximum charging efficiency when the fuel is injected in each of the intake and compression strokes during the cold-running phase as illustrated in FIG. 3.

First, when the accelerator pedal is at the fully depressed position as shown in the lower graph in FIG. 6, the charging efficiency reaches a predetermined value which corresponds to the fully-depressed accelerator position as shown in the upper graph in FIG. 6. Here, in FIG. 6, the upper limit to the charging efficiency is set to be lower, according to the relational expression in FIG. 5, than the maximum charging efficiency indicated by the one-dot chain line in FIG. 6, since the vaporization rate of the fuel is low. In other words, the maximum charging efficiency is limited (see the solid line). The engine controller 100 limits the opening of the throttle valve 57 to a smaller value than the maximum opening, thus limiting the maximum charging efficiency. Hence, as the charging efficiency is thus limited, the fuel injection valve 53 injects a less amount of the fuel. As a result, a gradual decrease in fuel pressure is successfully avoided in a situation where the accelerator is kept fully depressed, even if the high-pressure pump has a relatively small capacity. The high fuel pressure allows for atomizing the fuel well enough to avoid deterioration in vaporization of the fuel. This enables maintaining the maximum torque at a relatively high level.

Note that when the engine 1 is kept running at such a full load as described above, the temperature of the engine 1 rises immediately. Accordingly, the vaporization rate of the fuel fed into the cylinder 11 gradually increases. As a result, the limit to the maximum charging efficiency gradually goes closer to zero as illustrated in FIG. 5. Thus, when the engine 1 makes a transition to the warm-up phase or to the hot-running phase, the limit to the maximum charging efficiency goes zero. As can be seen, the maximum charging efficiency is limited for only a relatively short period of time and the engine 1 is kept running under a full load. Consequently, the maximum torque gradually increases. This is effective in reducing the loss of the sense of linear acceleration.

As indicated by the solid line in FIG. 6, the engine control described above is performed only for the sake of limiting the maximum charging efficiency. Thus, the responsiveness of the change in the opening of the throttle valve 57 to the change in the accelerator position is no different from that during a regular running phase that is different from the cold-running phase under a heavy load. Hence, the torque increases quickly enough as the driver depresses the accelerator pedal, thus contributing to reducing uncomfortable feeling the driver might experience during driving while allowing the driver to feel the vehicle accelerate linearly. Moreover, when the accelerator is at a partially depressed position, the maximum charging efficiency is free from the limit. In other words, this is equivalent to not performing this control when the engine 1 is under a light or medium load, even if the engine 1 is in the cold-running phase. This also works favorably in eliminating the driver's uncomfortableness.

In contrast, as indicated by the broken line in the upper graph of FIG. 6, a different kind of control may be executed to limit the fuel injection amount by delaying the responsiveness of the change in the opening of the throttle valve 57 to the change in accelerator position, and to avoid the situation where the fuel pressure gradually decreases. Such a control, however, fails to quickly increase the torque as the driver depresses the accelerator pedal, which makes the driver feel uncomfortableness and the loss of the sense of linear acceleration. This control is different from such a transient control.

In the upper graph in FIG. 6, the two-dot chain line represents the maximum charging efficiency when the fuel is injected during the intake stroke alone. As described above, when only the intake stroke injection is carried out during the cold-running phase under a heavy load, the opening of the throttle valve 57 is decreased so that the decreased opening ensures the manifold vacuum. Consequently, the maximum charging efficiency is not more than approximately 0.4.

In contrast, the compression stroke injection executed in the cold-running phase under a heavy load enables ensuring the vaporizability of the fuel. Compared with the situation where only the intake stroke injection is carried out, the maximum charging efficiency in the cold-running phase under a heavy load is significantly increased compared to when both of the stroke injections are carried out. The upper limit to the charging efficiency is lowered in accordance with the vaporization rate of the fuel. However, the significantly increased maximum charging efficiency enables setting the upper limit to the charging efficiency to be within the range of 0.5 to 0.7. In other words, even if the maximum charging efficiency is limited, this control enables achieving a relatively high maximum torque, thus allowing for obtaining high levels of fuel economy and driving performance in the cold-running phase.

Figure 7:
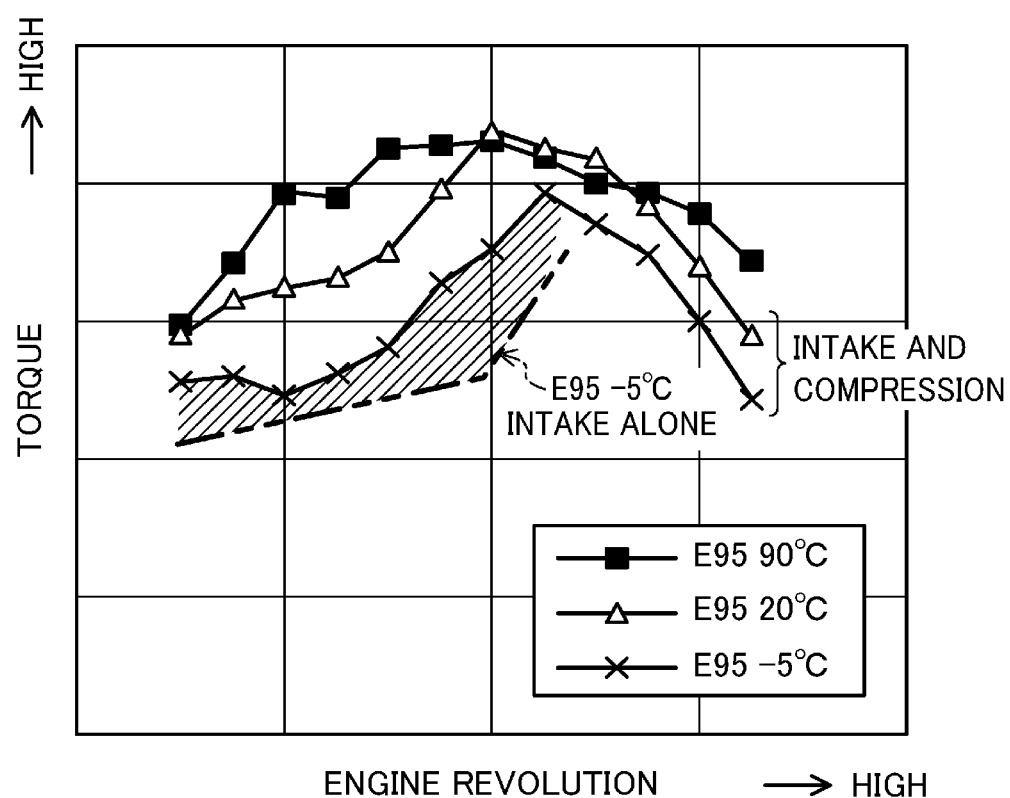
FIG. 7 shows how the engine maximum torque varies according to the fuel injection mode.

In this respect, FIG. 7 shows, in comparison, maximum torques associated with different fuel injection modes. In FIG. 7, the fuel in use is E95 having a high ethanol content, of which the vaporization rate decreases at a low temperature. Moreover, in FIG. 7, control parameters, such as a change in fuel injection timing and a limitation to the maximum charging efficiency, are changed in accordance with a change in engine temperature. However, other control parameters such as ignition timing are not changed.

First, the two-dot chain line in FIG. 7 indicates a full load of the engine equipped only with a fuel injection valve injecting fuel into the intake port. This is equivalent to a situation where only the intake stroke injection is executed in the cold-running phase (i.e., −5° C.). As can be seen, the maximum torque decreases when the intake stroke injection alone is executed in the cold-running phase.

In contrast, the line with the "crosses" in FIG. 7 indicates a full load observed when the intake stroke injection and compression stroke injection are executed in the cold-running phase. Compared with the situation where only the intake stroke injection is executed, the maximum torque is increased significantly.

Furthermore, the line with the "white triangles" in FIG. 7 indicates a full load when the temperature of the engine rises (i.e., 20° C. in the warm-up phase), and both the intake stroke injection and compression stroke injection are carried out. Compared with the cold-running phase, the maximum torque increases because of the relaxation of the limit to the maximum charging efficiency. Moreover, the line with the "black squares" in FIG. 7 indicates a full load when the temperature of the engine rises further and the engine reaches the warm-running phase (i.e., 90° C.). Since the engine is in the warm-running phase, the fuel is injected in the intake stroke only, and no limitation is imposed on the maximum charging efficiency. Here, only the intake stroke injection is executed in the warm-running phase. Thus, the cooling effect of the intake air increases the charging efficiency, and the resulting maximum torque becomes very high.

Note that the configuration described above is directed to FFV engines. Instead of FFV engines, the technique of the present disclosure is widely applicable to spark-ignition engines fed with a fuel containing an unconventional fuel such as alcohol.

Moreover, in the configuration described above, a single injection is supposed to be executed during the compression and intake strokes. However, multiple split injections may be executed during each of these strokes.

DESCRIPTION OF REFERENCE CHARACTERS

1 Engine (Engine Body)
11 Cylinder
100 Engine Controller
53 Fuel Injection Valve (Fuel Feeder)
54 Fuel Feeding System (Fuel Feeder)
57 Throttle Valve

The invention claimed is:
1. A control device for a spark-ignition engine, the device comprising:
an engine body configured to run with a fuel including an unconventional fuel, of which the vaporization rate is lower, at or below a specific temperature, than that of gasoline;
a fuel feeder configured to feed the fuel into a cylinder provided for the engine body, the fuel having had its pressure raised to a predetermined pressure; and
a controller configured to operate the engine body by controlling at least the fuel feeder, wherein
the controller is configured (i) to feed the fuel through the fuel feeder into the cylinder when the cylinder is in an intake stroke and in a compression stroke and when the engine body is both in a cold-running phase and under a heavy load, and (ii) to lower, to reduce air to be sucked into the cylinder, an upper limit of the charging efficiency when the temperature of the engine body is below a predetermined temperature being in the cold running phase, the engine body at or below a predetermined temperature being in the cold running phase, the load applied to the engine body being heavy when the engine body is under at least a predetermined load due to an operation of an accelerator pedal.

2. The device of claim 1, wherein
the controller is configured to lower the upper limit of the charging efficiency of the engine body as the content of the unconventional fuel increases in the fuel to be fed into the cylinder.
3. The device of claim 1, wherein
the controller lowers the upper limit of the charging efficiency of the engine body as the temperature of the engine body decreases.
4. The device of claim 1, further comprising
a throttle valve configured to adjust an amount of fresh air to be charged into the cylinder, wherein
the controller is configured to:
receive information about a position of the accelerator, and adjust an opening of the throttle valve according to the position of the accelerator; and
change the opening of the throttle valve with predetermined control responsiveness to a change in the position of the accelerator, and lower an upper limit of the opening of the throttle valve as the vaporization rate of the fuel, fed into the cylinder, decreases when the engine body is both in the cold-running phase in which the engine body is at or below the predetermined temperature, and under the heavy load that is equal to or greater than a predetermined load.
5. The device of claim 2, wherein
the controller lowers the upper limit of the charging efficiency of the engine body as the temperature of the engine body decreases.
6. The device of claim 2, further comprising
a throttle valve configured to adjust an amount of fresh air to be charged into the cylinder, wherein
the controller is configured to:
receive information about a position of the accelerator, and adjust an opening of the throttle valve according to the position of the accelerator; and
change the opening of the throttle valve with predetermined control responsiveness to a change in the position of the accelerator, and lower an upper limit of the opening of the throttle valve as the vaporization rate of the fuel, fed into the cylinder, decreases when the engine body is both in the cold-running phase in which the engine body is at or below the predetermined temperature, and under the heavy load that is equal to or greater than a predetermined load.
7. The device of claim 3, further comprising
a throttle valve configured to adjust an amount of fresh air to be charged into the cylinder, wherein
the controller is configured to:
receive information about a position of the accelerator, and adjust an opening of the throttle valve according to the position of the accelerator; and
change the opening of the throttle valve with predetermined control responsiveness to a change in the position of the accelerator, and lower an upper limit of the opening of the throttle valve as the vaporization rate of the fuel, fed into the cylinder, decreases when the engine body is both in the cold-running phase in which the engine body is at or below the predetermined temperature, and under the heavy load that is equal to or greater than a predetermined load.
8. The device of claim 5, further comprising
a throttle valve configured to adjust an amount of fresh air to be charged into the cylinder, wherein
the controller is configured to:
receive information about a position of the accelerator, and adjust an opening of the throttle valve according to the position of the accelerator; and
change the opening of the throttle valve with predetermined control responsiveness to a change in the position of the accelerator, and lower an upper limit of the opening of the throttle valve as the vaporization rate of the fuel, fed into the cylinder, decreases when the engine body is both in the cold-running phase in which the engine body is at or below the predetermined temperature, and under the heavy load that is equal to or greater than a predetermined load.

* * * * *

UNITED STATES PATENT AND TRADEMARK OFFICE
CERTIFICATE OF CORRECTION

PATENT NO. : 9,926,860 B2  
APPLICATION NO. : 14/783358  
DATED : March 27, 2018  
INVENTOR(S) : Kyohei Yasuda et al.

Page 1 of 1

It is certified that error appears in the above-identified patent and that said Letters Patent is hereby corrected as shown below:

On the Title Page

Under item (87), the PCT Publication Date should be changed from "PCT Pub. Date: Dec. 23, 2014" to --PCT Pub. Date: Oct. 23, 2014--

Signed and Sealed this  
Sixteenth Day of October, 2018

Andrei Iancu  
*Director of the United States Patent and Trademark Office*